United States Patent [19]
Zieve

[11] Patent Number: 5,521,782
[45] Date of Patent: May 28, 1996

[54] GROUND FAULT DETECTION SYSTEM IN A POWER SUPPLY FOR AN ELECTROMAGNETIC RIVETING APPARATUS

[75] Inventor: Peter B. Zieve, Seattle, Wash.

[73] Assignee: Electroimpact, Inc., Mukilteo, Wash.

[21] Appl. No.: 301,233

[22] Filed: Sep. 6, 1994

Related U.S. Application Data

[62] Division of Ser. No. 866,843, Apr. 10, 1992, Pat. No. 5,345,161.

[51] Int. Cl.⁶ .................................................. H02M 3/18
[52] U.S. Cl. ........................... 361/42; 361/45; 361/115
[58] Field of Search ................................ 361/45, 47, 50, 361/93, 42, 115; 324/51, 52

[56] References Cited

U.S. PATENT DOCUMENTS 4,638,245  1/1987  MacPhee .................................. 324/51

*Primary Examiner*—A. D. Pellinen
*Assistant Examiner*—S. Jackson

*Attorney, Agent, or Firm*—Jensen & Puntigam

[57] ABSTRACT

The power supply, useful with an electromagnetic force apparatus such as a riveter or a bolt inserter, includes two capacitor banks which are charged through charging doubler modules. Each charging doubler module includes an AC capacitor which is responsive to a power source. The AC capacitor is connected to a node point between two diode elements, which are connected in series across the capacitor bank. An analog-to-digital converter converts the voltage on the capacitor bank to a digital voltage for comparison with a selected digital charge voltage in a controller. The selected digital charge voltage may vary over time by means of a compensating algorithm. A ground fault indicator using a biasing voltage is connected between a selected electrical circuit portion of the force apparatus and earth ground. A gas discharge tube in combination with a current sensing element is connected to the capacitor banks to determine a possible over-voltage condition. A Hall-effect sensor is mounted between bus connections which carry the current between the capacitor bank and a coil portion of the electromagnetic force apparatus to determine the current flowing into the coil by measurement of the magnetic field between the bus bars.

12 Claims, 6 Drawing Sheets

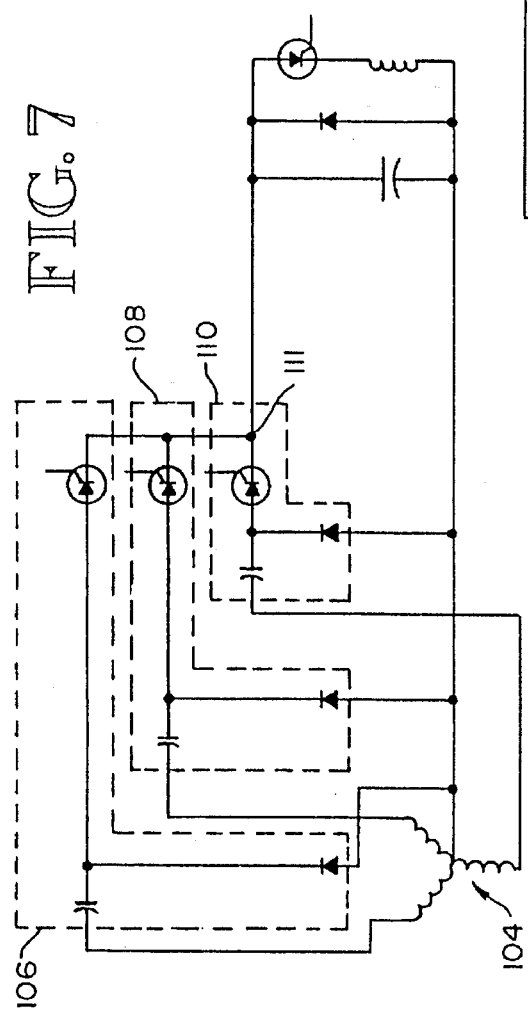
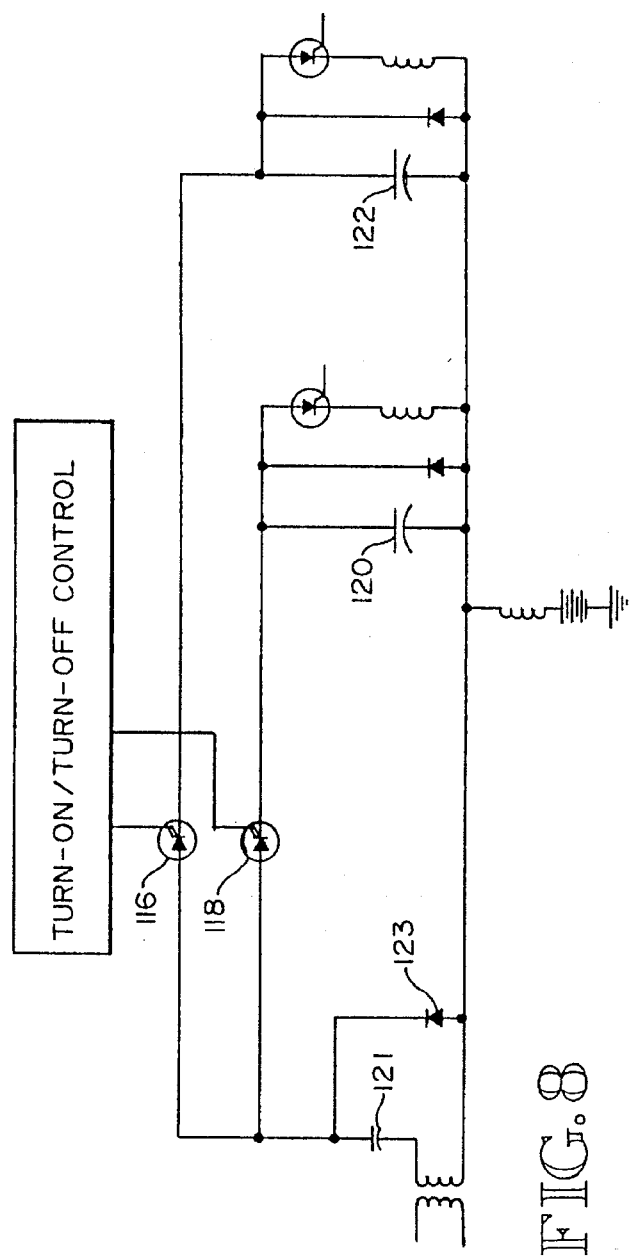

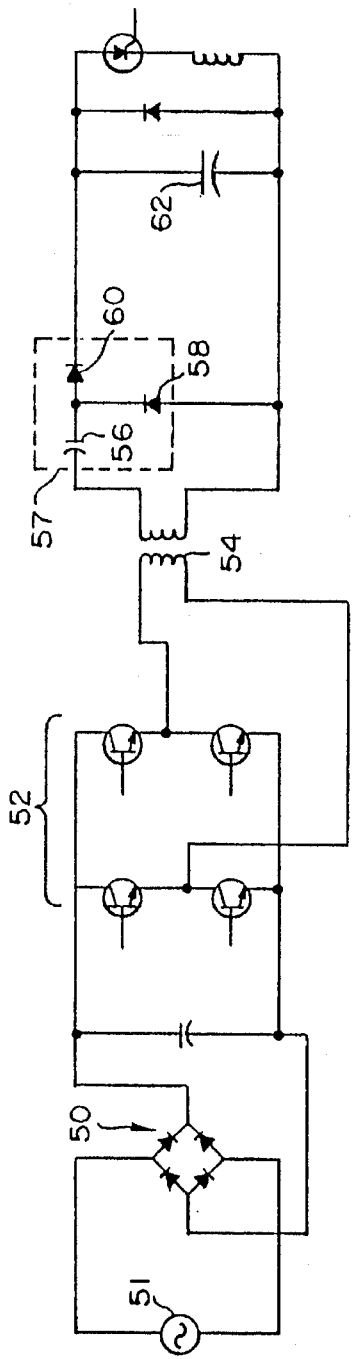
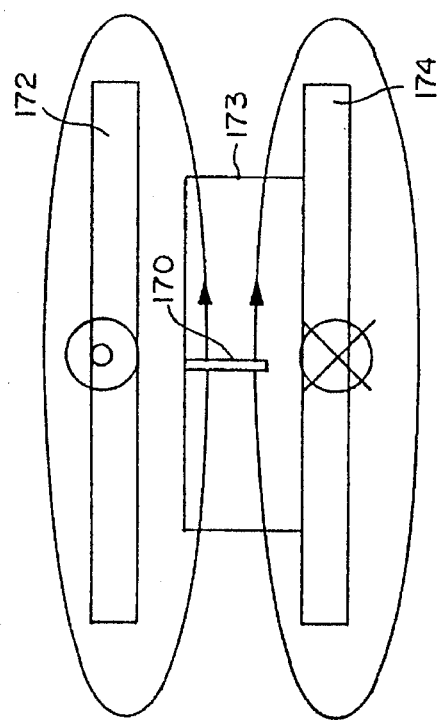
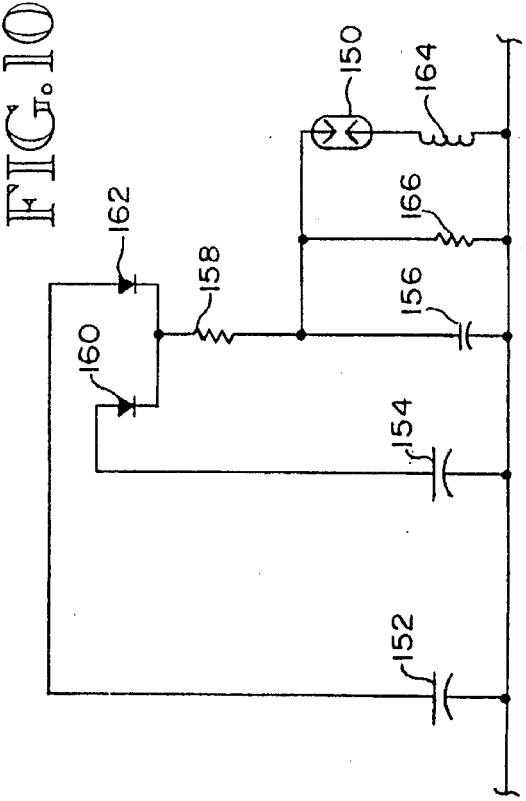

GROUND FAULT DETECTION SYSTEM IN A POWER SUPPLY FOR AN ELECTROMAGNETIC RIVETING APPARATUS

This is a divisional of application Ser. No. 866,843, filed on Apr. 10, 1992 now U.S. Pat. No. 5,345,161.

TECHNICAL FIELD

This invention relates generally to the art of electromagnetic force systems, such as electromagnetic riveting or bolt insertion systems, and more specifically concerns a power supply for use with such an electromagnetic force system or other system using a bank of DC capacitors as a high-energy power source.

BACKGROUND OF THE INVENTION

In an electromagnetic riveting (EMR) system, such as shown in U.S. Pat. No. 4,862,043 to Peter Zieve, a plurality of high-energy DC capacitors, connected into a parallel arrangement of capacitors, referred to herein as a "bank" of capacitors, are repeatedly charged to a selected voltage, i.e. 500 volts, and then discharged through a flat coil to create a significant repulsion force between the coil and a driver element, which is propelled forwardly to produce a desired work effect, such as forming a rivet or insertion of a bolt, by means of a tool at a nose end of the driver. In one particular embodiment of an electromagnetic riveting system, two separate banks of capacitors are used to power opposing riveters, with the two banks of capacitors being separately charged and discharged.

Such a system must be quite rugged and capable of continuous automatic operation. In many applications, such as the manufacture of aircraft, the output force pulse produced by the riveting apparatus must be carefully controlled and in particular must be matched to the characteristics of the fastener being worked upon. Different fasteners, i.e. different sizes/configurations of rivets and/or bolts, will require somewhat different force pulses. The output force pulse of the riveting apparatus must hence be controllable and produce repeatable results within a relatively close tolerance. Accordingly, the control circuits for the EMR system, in particular the power supply, are a very important part of the system.

Many important operating features of an electromagnetic riveting system are associated in some respect with the operation of and characteristics of the power supply. For instance, the amount of force produced by the system is established by adjusting the voltage present on the capacitor banks before they are discharged. Repeatability of the riveting process requires compensation in the value of the charge voltage taking into account the varying temperature of the riveting coil and the capacitor bank, among other variables. Typically, this variation in charge voltage is accomplished through rather complex control algorithms. The power supply and the system controller must be relatively sophisticated in order to implement such a compensation approach. The accuracy of the charge voltage on the DC capacitor bank must be relatively high, at least in some applications, in order to achieve the desired results. In some cases, the accuracy must be within ±one volt. Such accuracy has not heretofore been possible with existing apparatus and techniques.

Further, in the operation of a conventional EMR in a rugged environment, from time to time a chip or other particle from the riveting operation (such as drilling) will actually enter the EMR riveter and penetrate the face of the EMR coil, resulting in arcing and possible destruction of the coil when the driver comes into physical contact with the coil, which occurs once per cycle. Also, the EMR electrical cables are subject to wear, such as in bushings, etc., and electrical shorting or arcing to ground can occur, again leading to system damage. While ground fault indicator (GFI) devices have been used on some electromagnetic riveting systems, these devices are typically powered from the charge voltage on the capacitor banks, such that the GFI device is reliable only when the capacitors are charged. If a chip intrusion does occur with such a system, the capacitor bank voltage (500 VDC) will shift, producing sufficient ringing noise in the wiring to sometimes discharge the capacitor bank (firing the device) at the wrong time, resulting in damage to the workpiece, which is highly undesirable.

Still further, it has been found desirable to efficiently monitor the charge voltage on the DC capacitors to ensure that the capacitors are not being overcharged. In this regard, it is important that the sensing of the charge voltage on the capacitors be independent of the actual operation of the riveting system itself but not require an external source of power.

Lastly, previous electromagnetic riveting apparatus have monitored overall operation of the EMR power system by using current transformers to measure the flow of current from the capacitor bank to the coil. A proper current value is a reliable indicator of proper operation of the EMR power system; however, current transformers are undesirable, since they require a substantial amount of space and a reset winding.

DISCLOSURE OF THE INVENTION

Accordingly, the invention includes a voltage charging circuit apparatus for charging a plurality of capacitors which are connected together to form a capacitor bank, comprising: a first AC capacitor having one side thereof connected to one end of a power source, and a diode circuit comprising a diode connected between the other side of the AC capacitor and the other end of the power source and an element having a diode function connected between said other side of the AC capacitor and one end of the capacitor bank, wherein the other end of the power source is connected to the other end of the capacitor bank, wherein the AC capacitor and the diode circuit define a charging doubler module.

Another feature of the invention includes another bank of capacitors and another charging doubler module for that capacitor bank, both charging doubler modules operating from one power source.

Another feature of the invention includes an analog-to-digital converter for converting the analog voltage present at the capacitor bank during charging thereof to a digital voltage and a controller, which is part of an electromagnetic force system, such as a riveter, the controller having stored therein a selected digital charge voltage, wherein the controller includes means for comparing the digital voltage with the selected digital charge voltage, and means responsive to results from said comparing means to control the charging doubler module such that the analog voltage on the capacitor bank reaches the selected voltage.

A further feature of the present invention, where the voltage-charging apparatus and the capacitor bank are part of an electromagnetic force apparatus for accomplishing mechanical work, includes means biasing a selected electrical circuit portion of the electromagnetic force apparatus at a selected potential to earth ground, said electrical circuit portion being isolated from earth ground during normal operation of the apparatus, and sensing means for determining current flow from the biasing means through the selected electrical current portion to earth ground, which is a reliable indication of a particular malfunction in the apparatus.

A still further feature of the invention includes means, responsive to the voltage on the capacitor bank, characterized by an ability to block current until a selected voltage is reached, at which point current is conducted therethrough, and further includes means for sensing when current is conducted by said voltage responsive means as a reliable indication of a particular malfunction in an electromagnetic force apparatus.

In yet another feature of the present invention involving an electromagnetic force apparatus, the electromagnetic force apparatus includes means for conducting current from the capacitor bank to an actuator coil in the electromagnetic apparatus, the invention including a Hall-effect sensor mounted in the vicinity of the current conductor means, the Hall-effect sensor in operation measuring the strength of the magnetic field surrounding the current conductor means and producing a corresponding signal output representative of the current in the current conducting means.

BRIEF DESCRIPTION OF THE DRAWINGS

FIG. 7 is an electrical circuit diagram showing an embodiment of the present invention for a three-phase power source.

FIG. 8 is an electrical circuit diagram showing another embodiment of the power supply circuit of the present invention.

FIG. 9 is an electrical circuit diagram showing another modification of the circuit of FIG. 3.

FIG. 10 is an electrical circuit diagram showing an over-voltage protection circuit for the power supply of the present invention.

FIG. 11 is a diagram showing an apparatus for determining the current from the capacitor banks to the coil in the apparatus of the present invention.

BEST MODE FOR CARRYING OUT THE INVENTION

Figure 1:
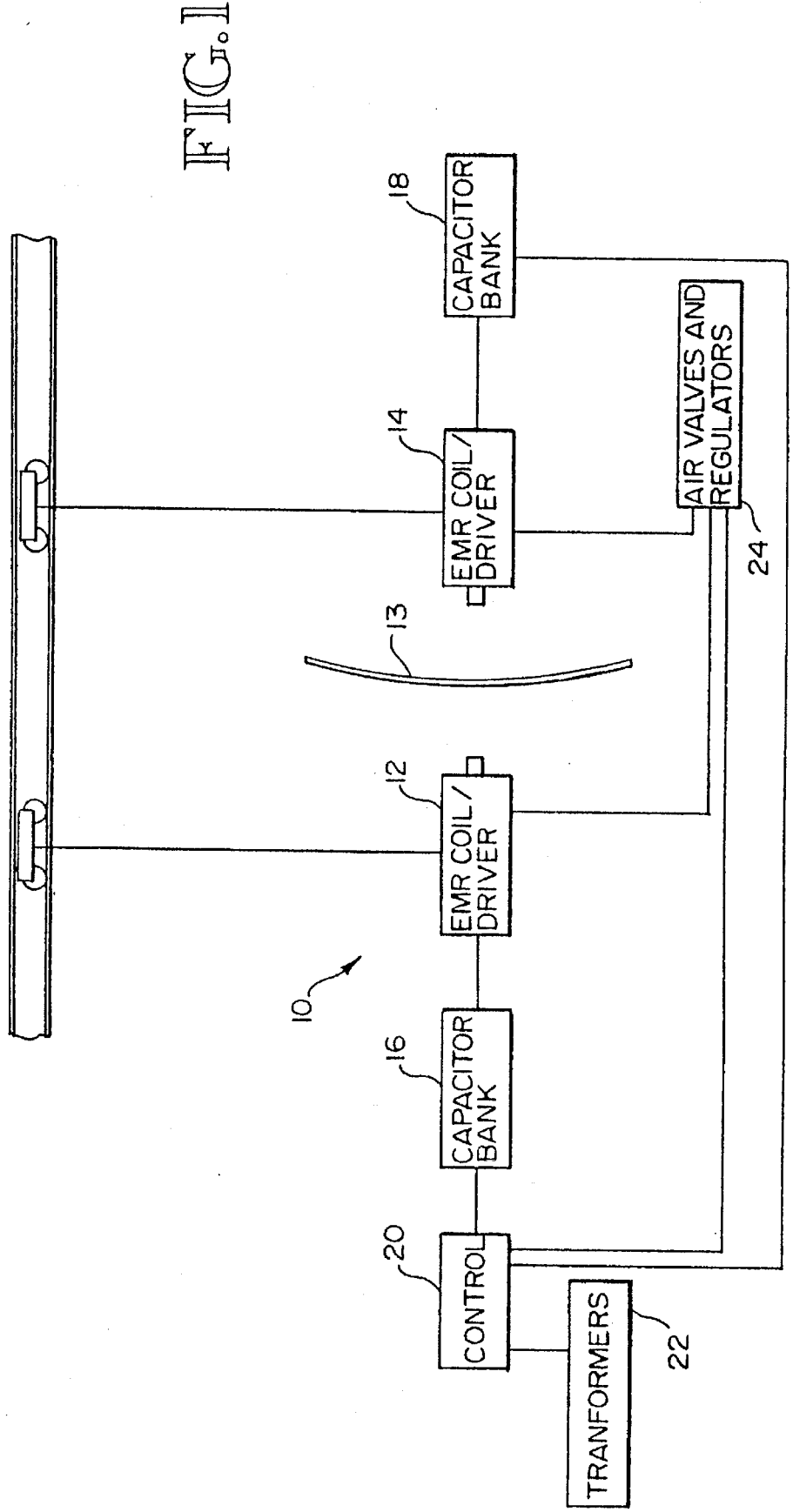
FIG. 1 is a schematic block diagram showing in simplified form an electromagnetic riveting system.

An electromagnetic riveting (EMR) system is shown generally at 10 in FIG. 1. The system includes two opposing electromagnetic riveters 12 and 14, each including a coil and a driver therein, among other elements, wherein in operation of the riveter the driver is propelled toward a workpiece 13 between the two riveters, such as an aircraft wing spar or the like. Each electromagnetic riveter includes a parallel-connected plurality (bank) 16, 18 of high-energy DC capacitors. In one embodiment, the capacitor banks each comprise 14 electrolytic capacitors, each capacitor being 3600 microfarads. Such a system is capable of repeatedly charging to a charge voltage of, for instance, 500 volts and then discharging, producing the required repulsion force for the driver to accomplish the desired work. A typical value of force provided by the driver on a rivet in such a system is 23,000 lbs.

In a typical EMR system, each capacitor bank will be charged in approximately one second, after which the bank is discharged with the driver being driven forward with the desired force. The capacitor bank then charges again, with the driver rebounding to its start position adjacent the coil. Supplying the necessary power to charge the capacitor banks is a power supply 20, which in turn is fed by transformers 22 which obtain power from a conventional 480 V power line. Other required elements in the EMR system, including air pressure regulators, etc., are shown as a block at 24 for simplicity. The structural details of an electromagnetic riveting apparatus and the operation thereof are disclosed in the '043 patent, referred to above, which is incorporated by reference herein. Although the electromagnetic force system is discussed herein in a riveting application, it should be understood that other high force mechanical operations, such as bolt insertion, can be accomplished with an electromagnetic system incorporating the present invention.

The present invention concerns the power supply/controller portion of an electromagnetic force system, referred to generally at 20 in FIG. 1, and specifically several improvements therein, which improve the reliability, accuracy and/or safety of the electromagnetic force system.

Figure 2:
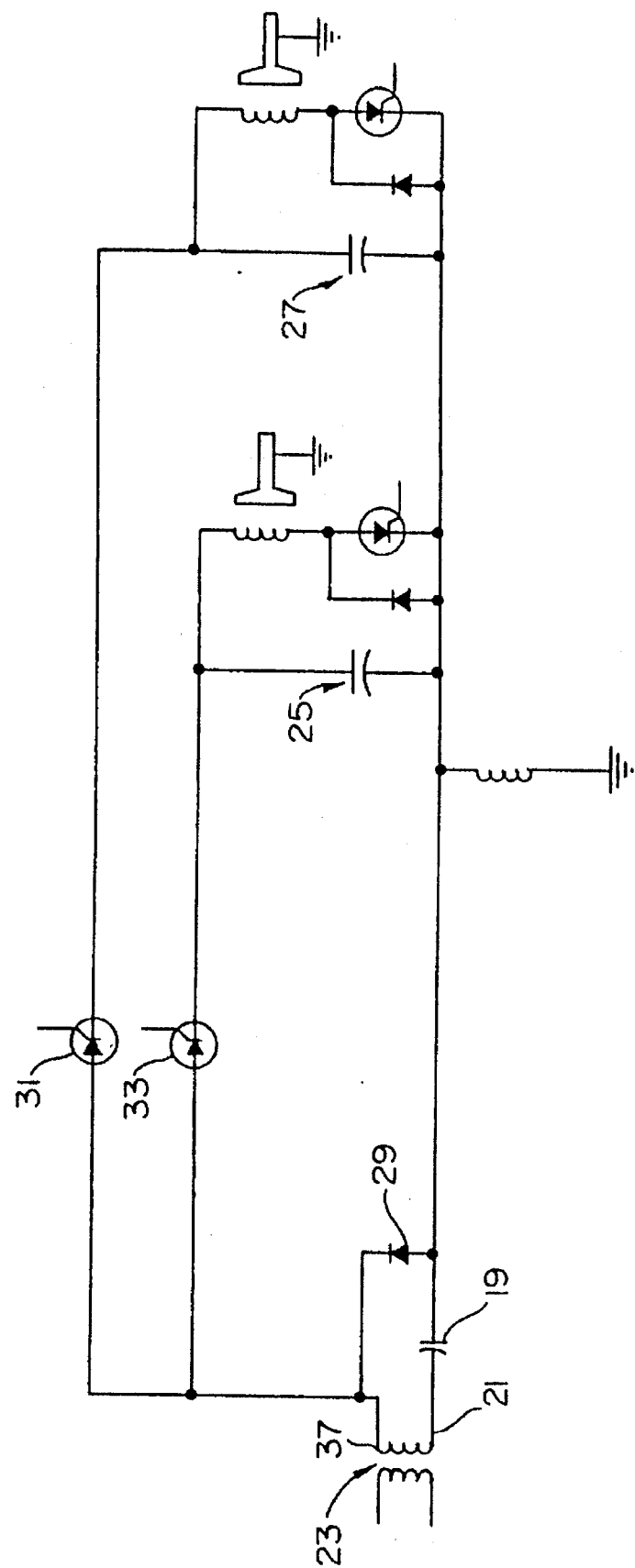
FIG. 2 is a circuit diagram showing an example of a prior art charging circuit for charging high-energy capacitor banks.

FIG. 2 shows a prior art charging circuit which includes an AC capacitor 19 connected from lower end 21 of the secondary of isolation transformer 23 to the respective low ends of two capacitor banks 25 and 27. A diode 29 is connected between AC capacitor 19 and upper end 37 of the secondary of transformer 23. Two SCRs 31 and 33 connect upper end 37 of the secondary of transformer 23 to the respective high ends of capacitor banks 25 and 27. While this circuit provides some charging control and regulation for the capacitor banks, the resulting charge voltage accuracy was not very high (approximately 1–2%). The present invention significantly improves the charge voltage accuracy achieved by such prior circuits, among other features.

Figure 3:
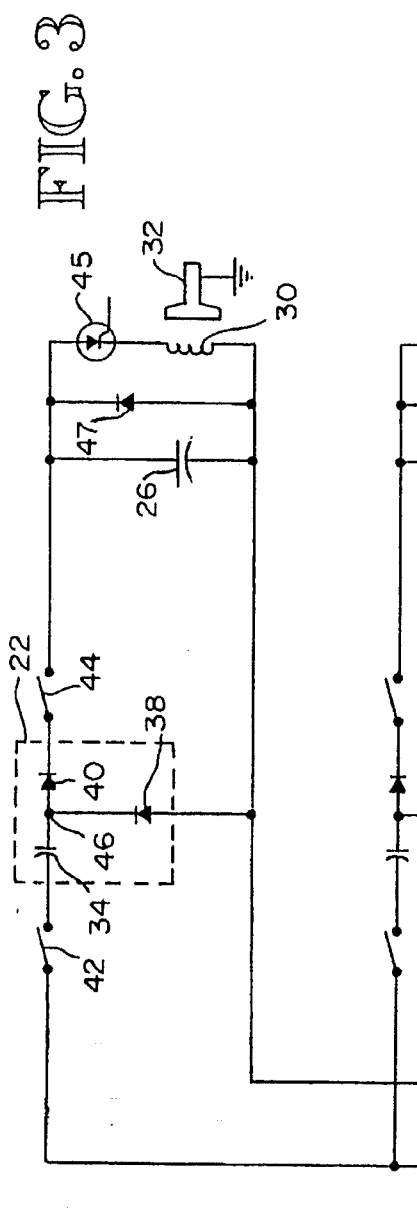
FIG. 3 is an electrical circuit diagram showing a power supply circuit of the present invention for charging the high-energy capacitor banks of the electromagnetic riveting apparatus of FIG. 1.

FIG. 3 shows an improved charging circuit module which controls and regulates the charging of two capacitor banks 26 and 28. The electromagnetic riveter coil and the associated driver are shown schematically at 30 and 32, respectively, with respect to capacitor bank 26. A conventional output SCR 45 and parallel diode 47 are also shown. A similar arrangement is present (but not described) for capacitor bank 28. In the improved circuit, the prior single AC capacitor is "partitioned," with the two separate AC capacitors each being approximately one-half, e.g. 180 microfarads the capacitance of the prior single AC capacitor (360 microfarads). The circuit of FIG. 3 thus includes two separate charging "modules," one for each capacitor bank. The charging module 35 for capacitor bank 26 includes AC capacitor 34, which is connected to one end or leg 39 of power source 36, which could be, for instance, the secondary of an isolation transformer or line voltage. The charging circuit or module 35 also includes diodes 38 and 40.

Switches 42 and/or 44 can be provided on the AC and the DC sides of AC capacitor 34. The other end or leg 41 of power source 36 is connected to the low end of capacitor bank 26.

In operation, power flows through switch 42 and AC capacitor 34 to a node point 46 between diodes 38 and 40. From the node point 46, AC power is rectified by the diodes and then flows through switch 44 to capacitor bank 26. Switches 42 and 44 control the flow of power from power source 36 into capacitor bank 26. An isolation transformer can be used on the AC side of the circuit. The power source 36 in that case will be the secondary of the transformer. As a variation of the arrangement of FIG. 2, the two AC capacitors can be connected to the other end or leg 41 of the AC power source, with the one leg 39 of the power source being common to the high end (positive terminals) of the capacitor banks, with corresponding adjustment in the arrangement of the other circuit elements relative to the capacitor banks.

Diode 38 permits AC capacitor 34 to charge to the peak negative voltage of the power source signal during each half-cycle when the power source signal has a negative slope. During this time, there will be no power flow to capacitor bank 26. During the positive slope half-cycle, the voltage on capacitor 34 is added to the voltage output from power source 36, and the sum of the two voltages charges capacitor bank 26, thereby providing a doubler effect. The circuit of FIG. 2 is thus a charging double module. An isolation transformer serving as the power source with a 240 V AC secondary is thus capable of charging a capacitor bank to a maximum voltage of 670 V DC ($2 \cdot 240 \cdot \sqrt{2}$).

Diode 40 can be replaced by an SCR. An SCR is a switch which provides voltage control and which includes an inherent diode function. It also provides additional functional capability as discussed below.

AC capacitor 34 in operation blocks the voltage differential between power source 36 and the capacitor bank 26. For instance, when capacitor bank 26 is at zero volts (when the charging cycle is just beginning), AC capacitor 34 has the entire AC voltage from the power source 36, i.e., it blocks the power source voltage from the capacitor bank. As capacitor bank 26 charges and the voltage therein increases, the AC voltage on capacitor 34 decreases. Thus, AC capacitor 34 allows voltage matching capability between the power source 36 and the capacitor bank (the load). Because of the series-connected AC capacitor 34, the charging circuit is current-limited and is inherently protected against short circuits. The AC short circuit current would be relatively small, equal to the AC voltage across the capacitor 34 multiplied by the AC capacitance and the $2\pi$ frequency.

Hence, in the circuit of FIG. 3, the AC capacitor 34 allows charging of capacitor bank 26 by supplying a controlled amount of charge thereto, while also providing a voltage doubling effect, permitting use of a lower power source voltage, thus increasing the safety of the overall circuit. With a similar circuit used for the other capacitor bank 28, system voltage accuracy is improved to approximately ½–1%.

FIG. 9 shows a variation of the circuit of FIG. 3 which can be run at a higher frequency, i.e. 10 kHz. The isolation transformer 54 can be considerably smaller and lighter than otherwise. In the circuit of FIG. 9, a bridge of diodes 50 is connected to a power source 51. The output of diode bridge 50 is applied to an H-bridge inverter circuit 52, the output of which is then applied to an isolation transformer 54. The H-bridge circuit 52 produces the desired high frequency signal. The output of isolation transformer 54 is applied to an AC capacitor 56, which is part of a charging doubler circuit 57 and which is on the order of 2 microfarads, significantly smaller than the AC capacitors of FIG. 3 (180 microfarads apiece), because of the high-frequency signal. The charging doubler circuit 57 also includes diodes 58 and 60. In operation, power flows to capacitor bank 62.

Figure 4:
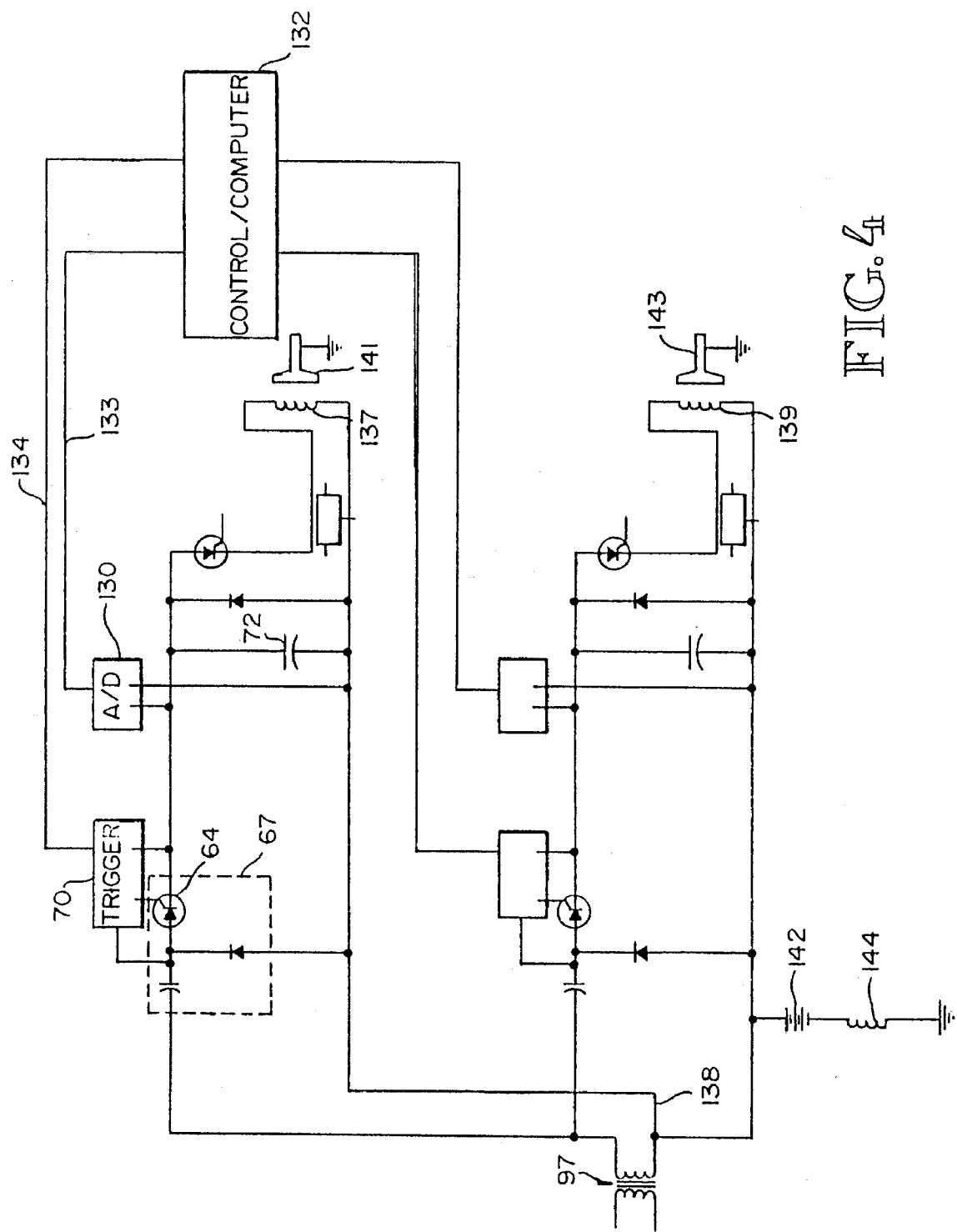
FIG. 4 is a more comprehensive circuit diagram shying several features of the power supply of the preset invention.

FIG. 4 shows a more comprehensive block diagram of a charging doubler circuit 67 of the present invention, incorporating a number of novel features. FIG. 4 shows the use of SCR (silicon-controlled rectifier) 64 as an alternative to diode 40 in FIG. 1. Other solid-state switches can be used instead of an SCR, as long as they include a diode function or characteristic. In operation, SCR 64 can be conveniently controlled by a zero crossing trigger circuit 70. Such a trigger circuit is commercially available from a number of manufacturers. This arrangement results in a number of advantages. The zero crossing trigger circuit 70 switches SCR 64 on only at the zero crossing point of the voltage signal from power source across the SCR. Hence, zero crossing trigger 70 is only on at the point in the voltage cycle where there is a minimum voltage differential. Otherwise, since the load (i.e. capacitor bank 72) is virtually all capacitance, large current transients would flow when SCR 64 would be triggered on. SCR 64 switches off through a commutation effect occurring when the slope of the power source signal goes from positive to zero, once each cycle.

The accuracy of such an arrangement with an SCR is adequate for most applications (within ±1 percent); some specialized applications, however, require even higher accuracy. The accuracy of the SCR embodiment is limited by the voltage rise of the capacitor bank in one cycle. Other solid-state switches such as a gate turnoff thyristor and transistor can be substituted for the SCR to improve the accuracy of the charging doubler circuits. These switches are capable of being turned off the instant that the desired output voltage on the capacitor bank is achieved, whereas the SCR is switched off through the natural commutation of the AC power signal once each cycle.

Figure 5:
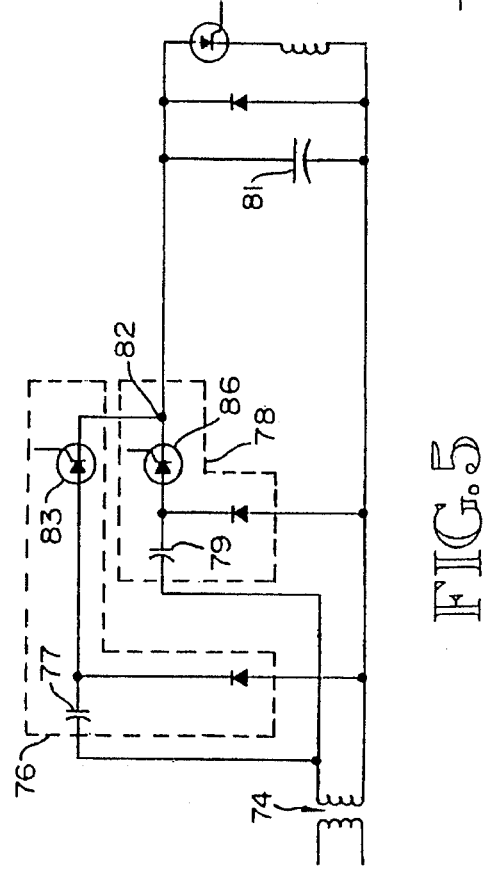
FIG. 5 is an electrical circuit diagram showing a modification of the circuit of FIG. 3.

A further modification of the charging doubler module circuit is shown in FIG. 5. This circuit includes what is referred to as a two-speed (or two-stage) charging arrangement. Only one capacitor bank is shown, but another module could be used for the other capacitor bank in a typical two-riveter system. In the embodiment shown, two charging modules, shown generally at 76 and 78, are used with a DC capacitor bank 81. In operation, the current from the two charging doubler modules 76 and 78, which are responsive to a power source 74, are summed together at node 82 to charge capacitor bank 81. The SCRs 83 and 86 (or alternatively, diodes) act as steering elements for the charging circuit.

Both charging doubler modules 76 and 78 are used to bring the voltage on capacitor bank 81 to a level which is approximately 5 volts or so below the desired voltage. At that level, one of the charging doubler circuits 76 is turned off by a controller (not shown) while the other one 78 completes the charging process. The AC capacitor 77 in charging doubler module 76 is typically smaller than the AC capacitor 79 in charging doubler module 78 to further enhance the accuracy of the desired charge voltage on the capacitor bank 81. Besides providing an increase in accuracy, the two-stage charging circuit of FIG. 5 is advantageous because it minimizes possible overshoot of the desired charge voltage, due to delay. Electrolytic capacitors are particularly well suited for use in a two-stage charging module, since it is preferable that such capacitors dwell or "set" for approximately one second near the desired peak voltage before firing in order to preserve the electrolytic characteristic of the capacitor.

Figure 6:
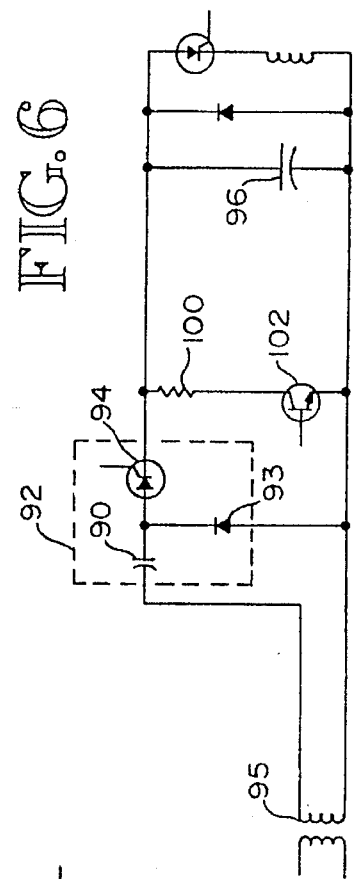
FIG. 6 is an electrical circuit diagram showing a variation of the circuit of FIG. 5.

FIG. 6 shows a variation of the two-stage charging circuit of FIG. 5. Again, only one capacitor bank 96 is shown for convenience of illustration. The charging doubler module 92 includes an SCR 94, a diode 93, an AC capacitor 90 and a power source 95. In operation, charging doubler circuit 92 will charge capacitor bank 96 to several volts past the desired charge voltage. Resistor 100 then will slowly bleed the voltage on the capacitor bank back down to the desired charge voltage under the control of transistor 102 acting as a control switch. This circuit is also quite suitable for computer control. The charge and drain circuit of FIG. 6 is also useful for reducing the charge voltage after the capacitor bank has been charged to an initial desired voltage, for instance if a smaller diameter rivet is to be used, which requires a lower voltage.

The charging doubler modules of the present invention are also advantageous when tile power source signal has two or more phases, with charging doubler modules being used for each phase. FIG. 7 shows such a configuration for a three-phase power source. Power source 104 feeds three separate charging doubler circuits 106, 108 and 110, one for each phase. A zero crossing will occur every 120° in the AC power source cycle with the three charging doubler circuits summing together at node 111. This approach triples the accuracy of the overall charging circuit over having one AC capacitor for each output capacitor bank. There are no time delays, since tile charging proceeds at full speed right up to the desired charge voltage. Two capacitor banks could be used with the circuit of FIG. 7, with an additional set of three diode function elements (like the SCRs), one for each phase used, connected from the respective capacitors, and summed for the other capacitor bank. Alternatively, if two high-energy capacitor banks are to be charged with the three-phase circuit, then a total of six charging modules are used.

FIG. 8 shows a further variation of the charging doubler module involving the use of a solid-state on-off switch in the place of the SCR in the charging doubler circuits, using gate turnoff thyristors and/or power transistors. The circuit in FIG. 8, for instance, uses gate turnoff thyristors 116 and 118. Since the charging of capacitor banks 120 and 122 can be terminated at the very instant that the voltage on the capacitor banks reaches the desired level, dual (partitioned) AC capacitors are not necessary and a single AC capacitor 120 with diode 122 can be used, with the two steering gate turnoff thyristors 116 and 118. Excellent accuracy is thus achieved. As an alternative to gate turnoff thyristors, transistor-diode series combinations having the appropriate voltage and current characteristics can be used. In operation, the two-gate turnoff thyristors are switched on only just after the zero crossing of the power signal, which will minimize the transients ordinarily resulting from the switching process. They are switched off the instant the output capacitor banks are at the desired charge voltage.

Referring now again to FIG. 4, another feature of the power supply of the present invention is illustrated. In this feature, the instantaneous voltage on the capacitor bank 72 is supplied to an analog-to-digital converter 130, with the resulting digital voltage applied to a voltage control computer, shown generally at 132 over line 133. Control computer 132 has stored therein the desired charge voltage for both capacitor banks. In operation, the instantaneous voltage (digital) from the capacitor banks (e.g. capacitor bank 72) is compared in software in the computer 132 with the desired charge voltage. If the instantaneous voltage is less than the desired voltage, the computer 132, through I/O line 134, controls zero crossing trigger 70 to turn on SCR 64 so that additional power can be supplied to capacitor bank 72.

Previously, this comparison was done in analog fashion, requiring voltage scaling and analog multipliers. The use of an analog-to-digital converter in the power supply of the present invention, for voltage comparison, is particularly significant when the temperature compensation and other compensation algorithms which are necessary to establish a proper voltage setting for the capacitor bank charge voltage are considered. As indicated above, the necessary (but not excessive) force to produce the desired riveting effect (or other work) depends on establishing a rather precise voltage level on the capacitor bank. This voltage level will differ depending upon the temperature of various elements of the EMR apparatus, as well as other variables. Again, as indicated above, complex compensation algorithms are designed to produce a change in the desired charge voltage during operation of the apparatus as the temperature conditions and other variables change. Implementation of the algorithms as part of a continuous voltage feedback/comparison system is much simpler when done digitally in computer 132.

In operation, the charging process for the capacitor banks through the charging doubler module 67 begins as discussed above. The voltage on capacitor bank 72 begins to rise correspondingly. The rising voltage on the capacitor bank is continuously digitized by the analog-to-digital converter 130 and applied to the voltage control computer 132 over line 133. Control computer 132 then compares that voltage (on a continuous basis) against the desired charge voltage, which is established in software by a basic charge voltage value, modified by the operation of the various compensating algorithms stored in the computer. Once the voltage on capacitor bank 72 reaches the desired charge voltage level, computer 132 through I/O line 134 turns charging doubler circuit 67 off through SCR 64.

As is shown from FIG. 4, a single control computer will typically be able to manage the voltage control settings and comparisons for two high-energy capacitor banks. Also, the two-stage charging techniques (FIGS. 5 and 6) can be implemented in software in computer 132.

The various charging doubler circuits discussed above can be readily used with the analog-to-digital converter technique described above for accurately controlling the charge voltage on the capacitor bank. The ability of the computer to implement complex control algorithms, including switching on and off the charging doubler circuits at selected times, which is discussed in more detail hereinafter with respect to another feature of the present invention, is a significant aspect of the power supply of the present invention. Another benefit of the A/D converter-digital processing feature of the present invention is the elimination of analog processing, which is typically more expensive to implement and ultimately less accurate for applications described herein.

A further feature of the power supply of the present invention is known as a ground fault interrupt circuit (GFI) and is also shown in FIG. 4. In operation, the GFI circuit determines when there is electrical contact between the riveter power circuit and earth ground. This is an undesirable short circuit condition and must be promptly detected.

Typically, electrical contact with earth ground will occur in the apparatus of the present invention when there is electrical contact between the driver and the coil. The coil is spiral-wound copper covered with a thin layer of fiberglass and Kapton. During each riveting cycle, the distance between the coil and the driver rapidly increases and decreases, including physical contact at one point in the cycle. If a chip or other particle, such as from drilling operations, should by chance enter the apparatus in the gap between the coil and the driver, the movement of the driver as it contacts the coil could push the chip through the coil insulation into the face of the coil, resulting in an electrical short to earth ground, an undesirable result, as indicated above.

In the feature of the present invention, the neutral end or leg 138 of the secondary of isolation transformer 97 is common to one side of both EMR coils 137 and 139. The EMR drivers 141, 143 are grounded through a support bearing (not shown) of the apparatus. The neutral leg 138 (and hence the power loop of the apparatus) is biased at a DC voltage (typically 24 volts) relative to ground by a GFI power supply 142. A current-sensing element 144 is connected between power supply 142 and earth ground. In normal operation of the apparatus, there will be no current flow through sensing element 144, since the power loop of the riveter is electrically isolated by means of isolation transformer 97. However, if electrical contact does occur between the coil and the driver as described above, for instance, or between a power cable and a metal bushing (such as might be caused by excessive wear on the cable insulation), the neutral leg 138 will be pulled to ground and the bias voltage from power supply 142 will appear across sensing element 144. The sensing element, either itself or in combination with other elements, will provide an indication to the operator that electrical contact has occurred, and also, if desired, can turn off the riveting machine.

In the embodiment shown, sensing element 144 is a 285-ohm relay trip coil portion of a shunt trip circuit breaker. A current flow through sensing element 144 caused by an electrical short circuit to earth ground will be sufficient to trip the circuit breaker, shutting off the riveting apparatus. Other current sensors may be used instead of a coil, including a light-emitting diode, which would form a part of a solid-state relay, or a combination of conventional relay coils and a resistor, in which the voltage drop across the resistor is directed to a comparator unit for determination of whether a short has occurred.

While a DC bias voltage is preferred for power supply 142, an AC bias could also be used. In another variation, the neutral leg 138 of the secondary of transformer 97 can be biased at a selected DC voltage, involving a limited current flow. The GFI circuit would then be activated when the voltage on the neutral leg drops toward earth ground. Since the desired voltage on the capacitor bank, e.g. 500 volts, will be present at the top of the coils 137, 139 at the instant the riveting apparatus fires, an electrical contact between the coil and the driver at that particular time will result in 500 volts across sensing element 144. The GFI circuit should thus be designed to withstand this maximum voltage.

Although the GFI circuit is shown connected to a single isolation transformer involving two riveters, it can be connected to just one or additional riveting systems as well.

A further feature of the power supply of the present invention protects the capacitor banks from being overcharged. An over-voltage condition on a capacitor bank can be caused by a loss of voltage feedback information or the failure of a control switch in the charging doubler module, for instance, among other causes. The capacitor bank will typically be rated for a DC voltage up to 500 volts. If the voltage on the capacitor bank is used to drive current through a linear resistor as a detector, a relatively small variation in analog current, i.e. 10 percent, can be detected to indicate an over-voltage condition. However, the resistor will dissipate considerable heat, an undesirable feature of such a system. In the present invention, referring to FIG. 10, a nonlinear voltage-responsive element is provided which has the characteristic of conducting no current below a selected voltage, but conducting above the voltage threshold. The voltage threshold is the over-voltage condition. Such an element is a gas discharge tube, shown at 150 in FIG. 10.

In operation, gas discharge tube 150 conducts essentially no current below a selected voltage. The voltage from capacitor banks 152 and 154 are provided through steering diodes 160 and 162 and resistor 158 to the gas discharge tube. Once the threshold voltage is exceeded, arcing occurs within the tube and the impedance of the tube decreases significantly. A single gas discharge tube can be used with both capacitor banks 152 and 154, or a separate gas discharge tube can be used with each capacitor bank. In the embodiment of FIG. 10, the highest voltage on capacitor banks 152, 154 will drive gas discharge tube 150. Capacitor 156 and resistor 158 form a low pass RC circuit which protects the tube 150 from being inadvertently triggered by high frequency noise.

In operation, capacitor 156 will charge; if and when the threshold level is exceeded, current, typically greater than 1 ampere, will flow from capacitor 156 through gas discharge tube 150 and then through sensing coil 164. The current thereafter is limited to a value of 25 milliamps by resistor 158, permitting gas discharge tube 150 to immediately commutate, so that capacitor 156 can begin to charge again. Resistor 166 provides a voltage divider effect with resistor 158, to shift the threshold point of the gas discharge tube, if desired.

It should be understood that nonlinear voltage devices other than a gas discharge tube can be used. For instance, a plurality of zener diodes or thyristors would also provide acceptable results. Further, sensing coil 164 could be a solid-state relay or a transistor-resistor combination.

A still further feature of the present invention is shown in FIG. 11. This feature involves the measurement of current into the coil of an EMR riveter, which provides an indication of the proper operation of the riveting apparatus. In this feature, a Hall-effect sensor 170 (in mounting block 173) is mounted between the current bus bar elements 172 and 174, which extend between the capacitor bank and the EMR coil (not shown) of the riveting apparatus. The bus bars 172 and 174 will typically be spaced between 1 and 4 inches apart, and will typically be 1½ inches by ⅛ inch in cross-section. In the region between bus bars 172 and 174, the magnetic field produced by the current through the bus bars is relatively uniform. The Hall-effect sensor 170 is sensitive to magnetic fields. Such a sensor may be obtained commercially from various sources, such as Microswitch.

In one embodiment, a linear output voltage is provided for a magnetic field between +2500 gauss and −2500 gauss. When the sensor is biased appropriately, a useful signal, i.e. 3 volts peak, is obtained at the time the capacitor bank is discharged. Since the magnetic field between the bus bars is proportional to the current therethrough produced by the discharge of the capacitor bank, the output signal from the Hall-effect sensor 170 is correspondingly proportional to the current to the coil.

If the bus bars are spaced such that the magnetic field between them exceeds the maximum capability of the sensor (2500 gauss) at the peak of the current, the spacing of the bus bars can be changed (widened), which results in the magnetic field spreading out until the field value is within the range of the sensor 170.

The current measurement in effect verifies proper operation of the riveter. It will determine, for instance, whether or not an EMR coil or one of the connections is faulty, even though the capacitor bank itself may be in good condition and charging to the desired voltage.

Hence, a power supply having a number of specific features has been disclosed which is particularly useful in an electromagnetic riveting or bolt-insertion system or other electromagnetic system. Some of the features are also useful in other systems using banks of high-energy capacitors.

Although a preferred embodiment of the invention has been disclosed herein for illustration, it should be understood that various changes, modifications and substitutions may be incorporated in such embodiment without departing from the spirit of the invention which is defined by the claims which follow:

What is claimed is:

1. An apparatus for determining an electrical short circuit in an electromagnetic force apparatus having an electrical circuit therein with positive and negative portions, comprising:

means for providing a substantially continuously applied bias between a single point in the electrical circuit in the electromagnetic force apparatus and earth ground, wherein said electrical circuit is in its entirety isolated from ground during normal operation of the apparatus; and a single sensing means for detecting current flow from the electrical circuit to earth ground, which is a reliable indication of a ground fault in the electrical circuit, regardless of whether the fault is in the positive or negative portion thereof.

2. An apparatus of claim 1, wherein the sensing means is a current sensor connected between the biasing means and earth ground.

3. An apparatus of claim 1, wherein said sensing means includes means for indicating to an operator when said current flow of a selected level is detected.

4. An apparatus of claim 1, wherein said sensing means includes means interrupting the operation of the apparatus when said current flow of a selected level is detected.

5. An apparatus of claim 1, wherein the biasing means is a DC potential.

6. An apparatus of claim 5, wherein the DC potential is approximately on the order of 24 volts.

7. An apparatus of claim 1, wherein the biasing means is an AC voltage.

8. An apparatus of claim 1, wherein said biasing means and said sensing means are connected to a plurality of electromagnetic force apparatus for detection of said current flow in each electromagnetic force apparatus.

9. An apparatus of claim 1, including a plurality of sensing means, wherein said biasing means and said plurality of current sensing means, respectively, are connected to a plurality, respectively, of electromagnetic force apparatus for detection of said current flow in each electromagnetic force apparatus.

10. An apparatus of claim 1, wherein said sensing means includes a shunt trip circuit breaker.

11. An apparatus of claim 1, wherein said sensing means includes a relay.

12. An apparatus of claim 1, wherein said current sensing means is a solid-state relay.

* * * * *